United States Patent
Byun et al.

(10) Patent No.: US 11,109,328 B2
(45) Date of Patent: Aug. 31, 2021

(54) METHOD AND APPARATUS FOR MEASURING DOWNLINK SYNCHRONIZATION IN WIRELESS COMMUNICATION SYSTEM

(71) Applicant: LG ELECTRONICS INC., Seoul (KR)

(72) Inventors: Ilmu Byun, Seoul (KR); Jiwon Kang, Seoul (KR); Heejeong Cho, Seoul (KR); Genebeck Hahn, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 370 days.

(21) Appl. No.: 16/305,385

(22) PCT Filed: May 31, 2017

(86) PCT No.: PCT/KR2017/005657
§ 371 (c)(1),
(2) Date: Nov. 28, 2018

(87) PCT Pub. No.: WO2017/213375
PCT Pub. Date: Dec. 14, 2017

(65) Prior Publication Data
US 2020/0329439 A1    Oct. 15, 2020

Related U.S. Application Data

(60) Provisional application No. 62/347,571, filed on Jun. 8, 2016.

(51) Int. Cl.
*H04W 4/00* (2018.01)
*H04W 56/00* (2009.01)
(Continued)

(52) U.S. Cl.
CPC ....... *H04W 56/001* (2013.01); *H04W 64/003* (2013.01); *H04W 68/005* (2013.01);
(Continued)

(58) Field of Classification Search
CPC combination set(s) only.
See application file for complete search history.

(56) References Cited

U.S. PATENT DOCUMENTS

2014/0328325 A1* 11/2014 Bai .................. H04W 36/0077
                                                            370/331
2018/0132284 A1*  5/2018 Oh ................... H04W 72/1289

FOREIGN PATENT DOCUMENTS

KR    20140122050    10/2014
KR    20150024333     3/2015
(Continued)

OTHER PUBLICATIONS

PCT International Application No. PCT/KR2017/005657, International Search Report dated Sep. 7, 2017, 4 pages.

*Primary Examiner* — Justin Y Lee
(74) *Attorney, Agent, or Firm* — Lee, Hong, Degerman, Kang & Waimey

(57) ABSTRACT

Provided are a method and an apparatus for obtaining a downlink synchronization in a wireless communication system. A proposed wireless communication system has an environment in which a resource position of a downlink synchronization signal is changed as multi-numerology is applied thereto. Specifically, a terminal transmits a preamble for requesting a synchronization signal transmission resource to a base station. The terminal receives a response signal to the preamble from the base station. Here, the terminal does not have linkage to the base station, and is downlink synchronized with the base station. The response
(Continued)

signal includes position information of a synchronization signal transmission resource of a neighboring base station.

13 Claims, 13 Drawing Sheets

(51) Int. Cl.
*H04W 76/11* (2018.01)
*H04W 64/00* (2009.01)
*H04W 68/00* (2009.01)
*H04W 72/04* (2009.01)
*H04W 74/08* (2009.01)

(52) U.S. Cl.
CPC ..... *H04W 72/042* (2013.01); *H04W 74/0833* (2013.01); *H04W 76/11* (2018.02)

(56) References Cited

FOREIGN PATENT DOCUMENTS

| | | |
|---|---|---|
| KR | 101563469 | 10/2015 |
| KR | 20150143135 | 12/2015 |
| WO | 2015046979 | 4/2015 |

* cited by examiner

METHOD AND APPARATUS FOR MEASURING DOWNLINK SYNCHRONIZATION IN WIRELESS COMMUNICATION SYSTEM

CROSS-REFERENCE TO RELATED APPLICATIONS

This application is the National Stage filing under 35 U.S.C. 371 of International Application No. PCT/KR2017/005657, filed on May 31, 2017, which claims the benefit of U.S. Provisional Application No. 62/347,571, filed on Jun. 8, 2016, the contents of which are all hereby incorporated by reference herein in their entirety.

BACKGROUND OF THE INVENTION

Field of the Invention

The present invention relates to wireless communication and, most particularly, to a method for measuring downlink synchronization in a wireless communication system, and a device using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A base station (BS) properly allocates radio resources to each piece of user equipment (UE) within a cell through scheduling. The UE may transmit control information or user data to the BS using the allocated radio resources. In this case, a method for transmitting control information and a method for transmitting user data may be different. Furthermore, a method for allocating radio resources for control information and a method for allocating radio resources for user data may be different. Accordingly, radio resources for control information and radio resources for user data may be different. A BS may differently manage radio resources reserved for control information and radio resources reserved for user data.

In a $3^{rd}$ generation partnership project (3GPP) long term evolution (LTE) system, a user equipment (UE) in an idle state must perform an RRC connection setup and a data connection setup before data transmission is performed. This means that both of a logical connection (RRC connection) between a base station (BS) and the UE and a logical connection (S1 connection/interface, EPS connection) between a mobility management entity (MME) and the UE are set up. Therefore, in order for the UE to perform data transmission, it takes an additional time corresponding to a time required to perform the connection setup. However, when the UE transmits or receives large-sized data once or twice, it is ineffective to perform the connection setup. Accordingly, a connectionless transmission method may be considered to solve this problem.

SUMMARY OF THE INVENTION

The present invention provides a method and an apparatus for measuring downlink synchronization in a wireless communication system.

The present invention proposes a method and an apparatus for measuring downlink synchronization on the basis of a connectionless transmission procedure in a wireless communication system.

The apparatus includes a radio frequency (RF) unit to transmit and receive a radio signal and a processor connected to the RF unit.

Defining terms first, a connectionless transmission procedure may correspond to a procedure in which a user equipment (UE) transmits data to a base station (BS) in a state where a connection between the UE and the BS is not established. The state where the connection between the UE and the BS is not established may correspond to an RRC-unconnected state, an idle state, or an inactive state. A connection transmission procedure may correspond to a procedure in which a UE transmits data to a BS after establishing an RRC connection and a data connection with the BS. Numerology may correspond to various values that can be used in next-generation wireless communication systems to achieve high reliability and low delay. For example, numerology may be a subframe length (TTI length), subcarrier spacing, the number of symbols of a subframe, and/or a CP length.

First, a UE transmits a preamble for requesting a synchronization signal transmission resource to a BS. Here, the UE is in a state of not establishing a connection with the BS (disconnected state) and of synchronizing in downlink with the BS.

The UE receives a response signal to the preamble from the BS. The response signal includes location information on a synchronization signal transmission resource for a neighboring BS. That is, even though the UE is in the disconnected state, the UE receives the location information on the synchronization signal transmission resource for the neighboring BS from the BS with which the UE currently synchronizes in downlink, thus efficiently achieving downlink synchronization even though the UE moves to another cell.

In addition, there is a case where the location information on the synchronization signal transmission resource needs to be updated. When the UE moves within the coverage of the neighboring BS to which the location information on the synchronization signal transmission resource is applied, the UE may receive an identifier of the neighboring BS from the neighboring BS. The UE may transmit a preamble for requesting the update of the location information on the synchronization signal transmission resource to the neighboring BS. That is, when the UE identifies, through the identifier of the neighboring BS, that the neighboring BS is a BS for which the location information on the synchronization signal transmission resource needs to be updated, the UE may transmit the preamble (message 1) requesting the update.

When the UE is out of the coverage of the neighboring BS to which the location information on the synchronization signal transmission resource is applied, the UE may transmit a preamble for requesting the update of the location information on the synchronization signal transmission resource to a BS out of the coverage of the neighboring BS.

The response signal may further include transmission period information on a synchronization signal. The UE may detect the synchronization signal for a time indicated by the transmission period information on the synchronization signal.

The preamble may be selected according to the moving speed of the UE. When the moving speed of the UE is high, a synchronization signal transmission resource may be configured in view of wide coverage. When the moving speed of the UE is low, a synchronization signal transmission resource may be configured in view of narrow coverage.

The location information on the synchronization signal transmission resource may be determined according to the preamble. That is, the BS may notify the UE of a different synchronization signal transmission resource list depending on the type of a preamble.

Downlink control information of the response signal may be masked with a temporary identifier to be transmitted. The temporary identifier may change depending on an identifier of the BS or the preamble. Downlink control information may be masked with a different temporary identifier value depending on the identifier of the BS or the preamble, thus enabling the UE to accurately receive a desired signal.

When the UE moves from a first tracking area to a second tracking area, the UE may receive preamble information to be used in the second tracking area through a paging signal. The preamble may be determined based on the preamble information. That is, the UE may manage a preamble by tracking area.

The preamble may be transmitted during a time interval in which the paging signal can be received. The BS may set a period for transmitting a preamble and a period for transmitting a paging signal. Here, the UE may jointly process an operation of transmitting a preamble and an operation of receiving a paging signal every specified period in view of the start points of the two periods, which is efficient in reducing the power consumption of the UE.

By using the proposed technique (or method), when a UE being in a connectionless state detects a synchronization signal in a next generation communication system, which authorizes multiple numerologies within a single carrier, the overhead may be reduced and the detection speed for detecting a synchronization signal may be increased at the same time.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
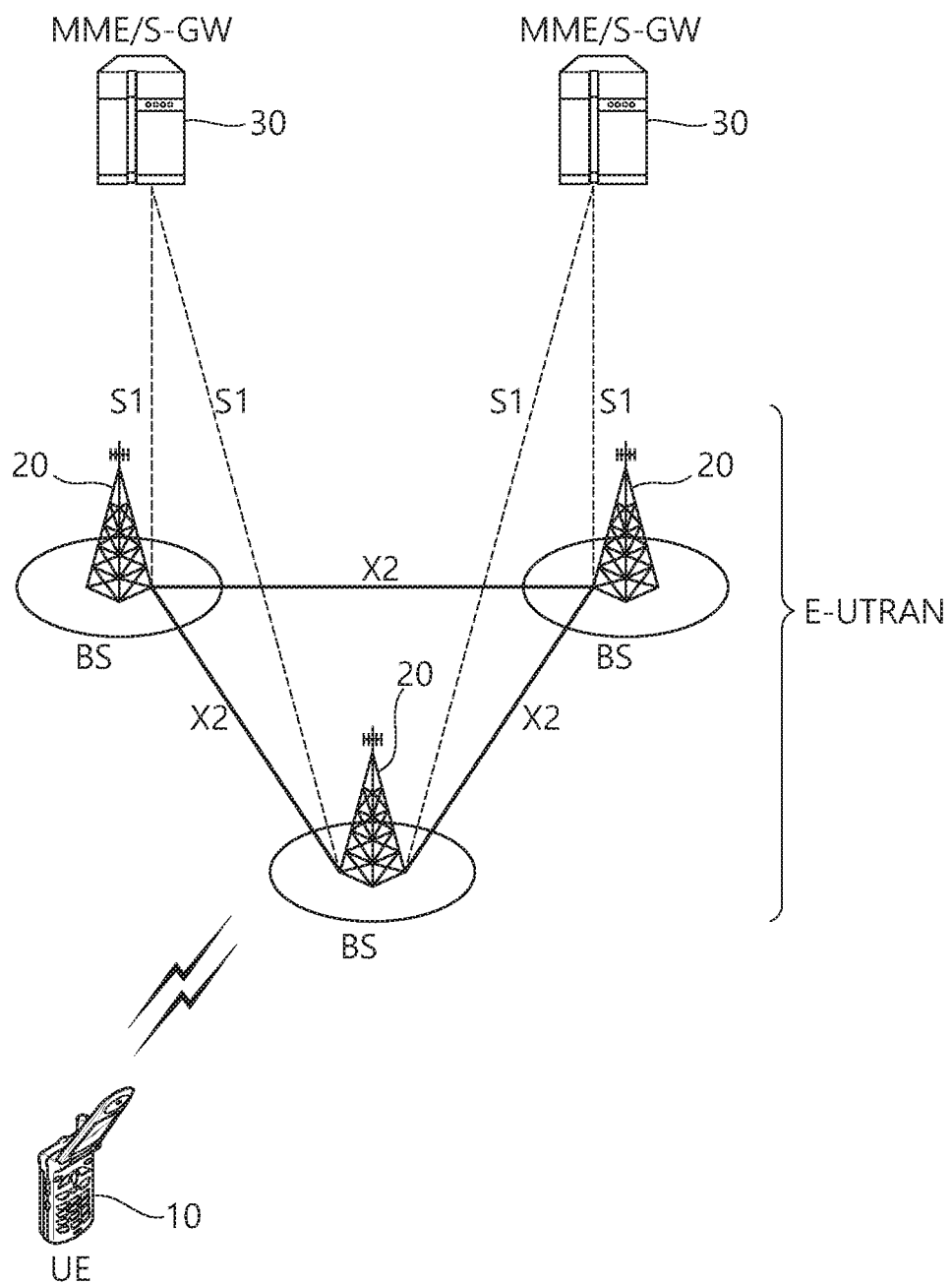
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
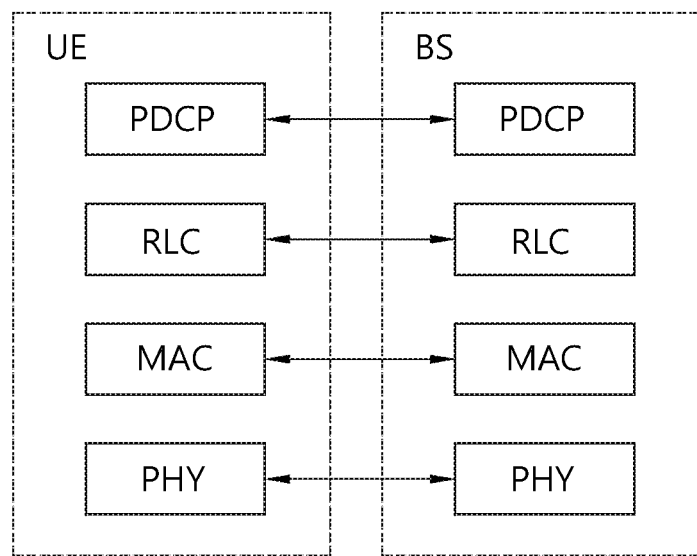
FIG. 2 is a diagram illustrating a radio protocol architecture for a user plane.
Figure 3:
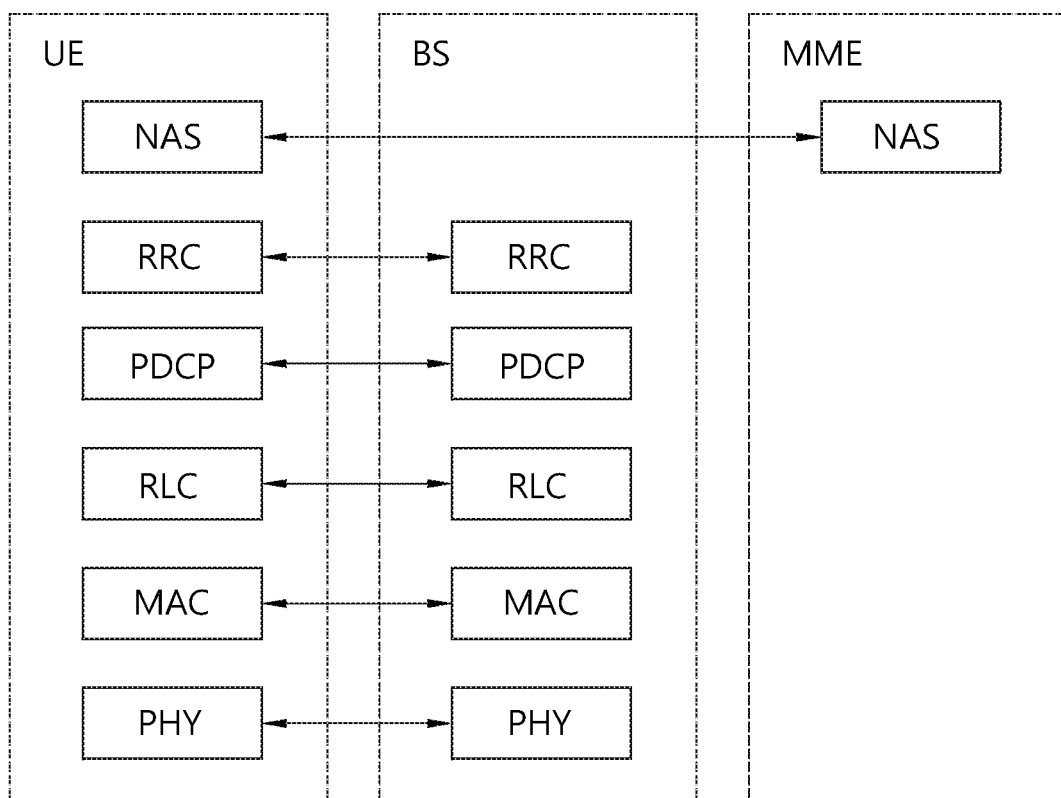
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
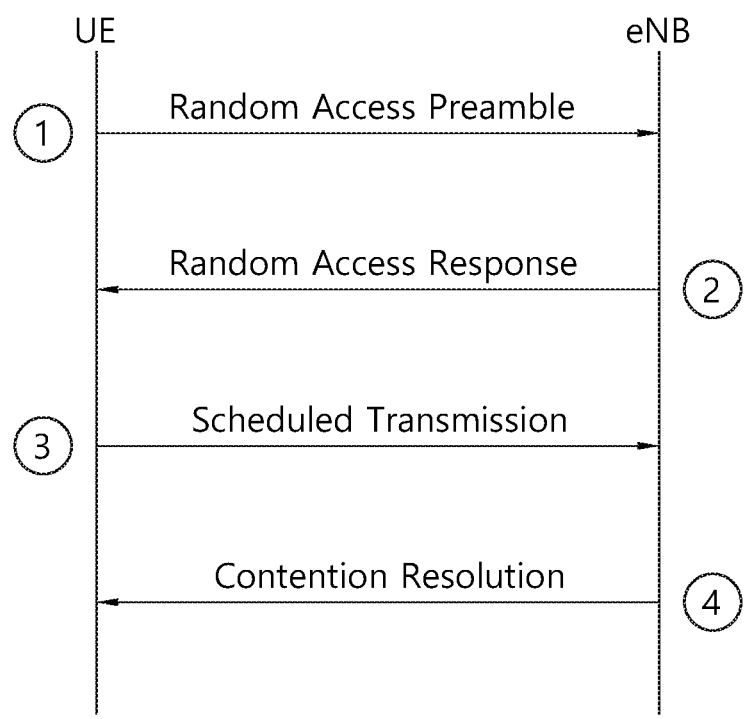
FIG. 4 shows a process of an operation performed between a user equipment (UE) and an eNodeB (eNB) in a contention-based random access procedure.

FIG. 4 shows a process of an operation performed between a UE and an eNB in a contention-based random access procedure.

First, in the contention-based random access, the UE may randomly select a random access preamble in a group of random access preambles indicated through system information or a handover command, may select a PRACH resource capable of transmitting the random access preamble, and may subsequently transmit the selected random access preamble to the eNB (step 1).

After transmitting the random access preamble, the UE may attempt to receive a response for the random access preamble in a random access response reception window indicated through the handover command (step 2). More particularly, the random access information may be transmitted in a form of a MAC PDU, and the MAC PDU may be transmitted on a physical downlink shared channel (PDSCH). Further, a physical downlink control channel (PDCCH) is transmitted so that the UE can properly receive information transmitted on the PDSCH. That is, the PDCCH includes information regarding a UE for receiving the PDSCH, frequency and time information of radio resources of the PDSCH, a transmission format of the PDSCH, or the like. Herein, if the PDCCH is successfully received, the UE may properly receive a random access response transmitted on the PDSCH according to information of the PDCCH. The random access response may include a random access preamble identifier (ID), an uplink (UL) grant, a temporary C-RNTI, a time alignment command (TAC), or the like. Herein, the random access preamble ID is included in the random access response. This is to inform the UE about which information is information regarding a UL grant, a temporary C-RNTI, a time alignment command among valid (available) information. As such, the random access preamble ID is necessary since one random access response may include random access information for one or more UEs. Herein, the random access preamble ID may be the same as a random access preamble selected by the UE in the step 1.

When the UE receives a random access response which is valid for the UE, the UE may process information included in the random access response. That is, the UE stores the temporary C-RNTI. In addition, the UE uses a UL grant to transmit data stored in a buffer of the UE to the eNB or to transmit newly generated data to the eNB (step 3). Herein, a UE identifier must be necessarily included in data included in the UL grant (message 3). The reason above is that, in the contention-based random access procedure, the eNB cannot determine which UEs perform the random access procedure, and the UEs must be identified for contention resolution at a later time. Herein, in order to include the UE identifier, two different methods may be provided. A first method is for transmitting a cell identifier of the UE through a UL grant as to whether the UE has already received a valid cell identifier assigned in a corresponding cell before the random access procedure. On the contrary, a second method is for transmitting a unique ID of the UE if the UE does not receive the valid cell ID before the random access procedure. In general, the unique identifier of the UE is longer than the cell identifier. If the UE has already transmitted data through the UL grant in step 3, the UE starts a contention resolution timer.

After data is transmitted together with an identifier through the UL grant included in the random access response, the UE waits for an indication or instruction of an eNB for the contention resolution. That is, the UE attempts a reception of a PDCCH to receive a specific message (step 4). Herein, two methods are present to receive the PDCCH. As described above, if the UE identifier transmitted through the UL grant is a cell identifier, the UE attempts a reception of the PDCCH by using a cell identifier of the UE. If the UE identifier transmitted through the UL grant is a unique identifier of the UE, the UE attempts a reception of the PDCCH by using a temporary C-RNTI included in the random access response. Thereafter, in the former case, if the PDCCH (message 4) is received through the cell identifier before the contention resolution timer expires, the UE determines that the random access procedure is successfully performed, and finishes the random access procedure. In the latter case, if the PDCCH is received through the temporary cell identifier before the contention resolution timer expires, the UE checks data (message 4) transmitted by a PDSCH indicated by the PDCCH. If the unique identifier of the UE is included in the data, the UE determines that the random access procedure is successfully performed, and finishes the random access procedure.

Hereinafter, connectionless transmission will be described.

In a 3GPP LTE system, a UE in an idle state must perform an RRC connection setup and a data connection setup before data transmission is performed. This means that both of a logical connection (RRC connection) between an eNB and the UE and a logical connection (S1 connection/interface, EPS connection) between a mobility management entity (MME) and the UE are set up.

Figure 5:
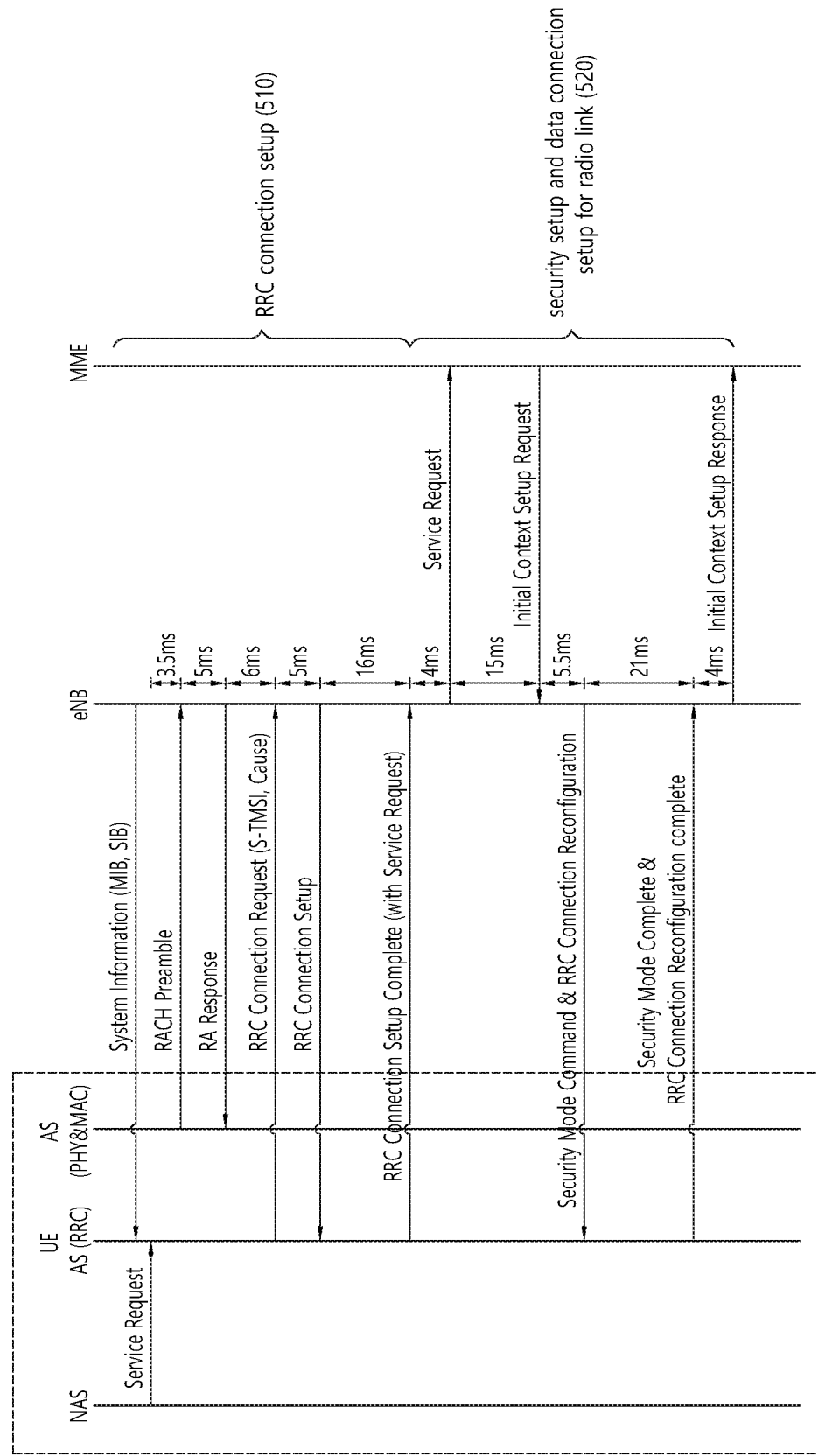
FIG. 5 shows a connection setup procedure and a required time in 3$^{rd}$ generation partnership project (3GPP) long term evolution (LTE).

FIG. 5 shows a connection setup procedure and a required time in 3GPP LTE.

Referring to FIG. 5, a UE first performs an RRC connection setup (see 510) with an eNB before transmitting data. The UE receives system information such as a master information block (MIB) and a system information block (SIB) from the eNB. In addition, the UE transmits a random access preamble through an RACH resource, and receives a random access response in response thereto. Thereafter, the UE transmits an RRC connection request to the eNB, and receives an RRC connection setup message from the eNB. When the UE transmits an RRC connection setup complete message to the eNB, the RRC connection setup (see 510) may be performed.

When the RRC connection setup (see 510) is performed with respect to the eNB, the UE performs a security setup and data connection setup for a radio link (see 520) with respect to a mobility management entity (MME). The eNB transmits a service request to the MME, and the MME transmits an initial context setup request to the eNB. The eNB transmits security mode command and RRC connection reconfiguration messages to the UE. The UE transmits security mode complete and RRC connection reconfiguration complete messages to the eNB. Thereafter, the eNB transmits an initial context setup request to the MME. In doing so, the UE may perform the security setup and data connection setup for the radio link (see 520) with respect to the MME.

Since it takes 35.5 ms in total for the RRC connection setup (see 510) and it takes 49.5 ms in total for the security setup and data connection setup for the radio link (see 520), it takes 85 ms in total as a time for transitioning a connected state of the UE in the idle state.

If it is intended to transmit UL data after transitioning the connected state of the UE, the UE must undergo a step of transmitting a scheduling request to the eNB. A procedure of transmitting the UL data and a delay caused thereby are described below with reference to FIG. 6 and FIG. 7.

Figure 6:
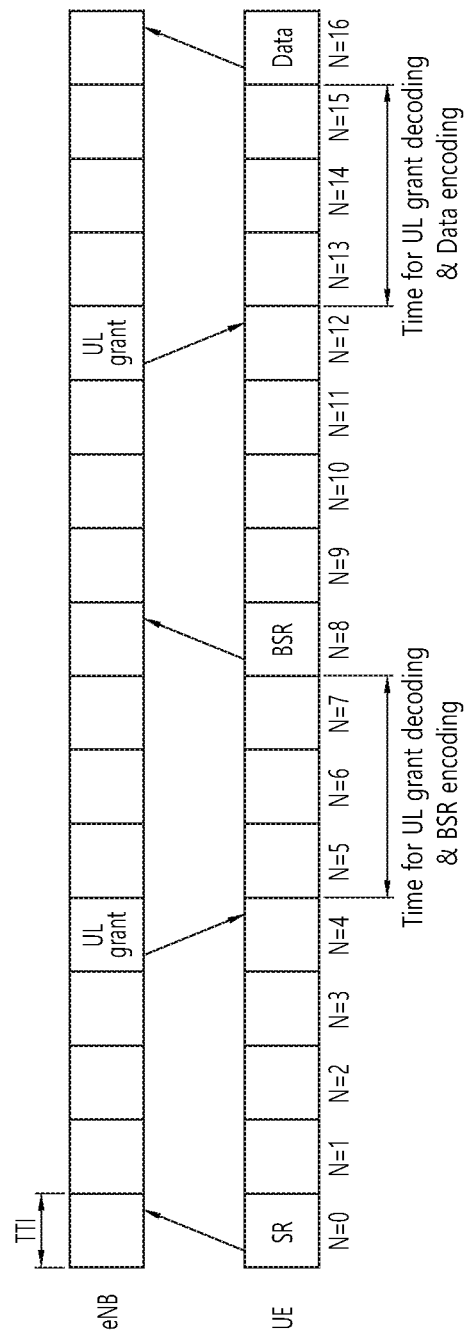
FIG. 6 shows a required time in a method of assigning an uplink resource through a scheduling request in 3GPP LTE.

FIG. 6 shows a required time in a method of assigning a UL resource through a scheduling request in 3GPP LTE.

Referring to FIG. 6, a UE transmits a scheduling request (SR) to an eNB, and the eNB transmits a UL grant to the UE. The UE decodes the UL grant during a specific duration, and encodes a buffer status report (BSR). Thereafter, the UE transmits the encoded BSR to the eNB, the eNB transmits the UL grant to the UE, and the UE transmits data to the eNB according to the UL grant. The method of assigning the UL resource through the SR may generate a delay of 9.5 ms in total.

Figure 7:
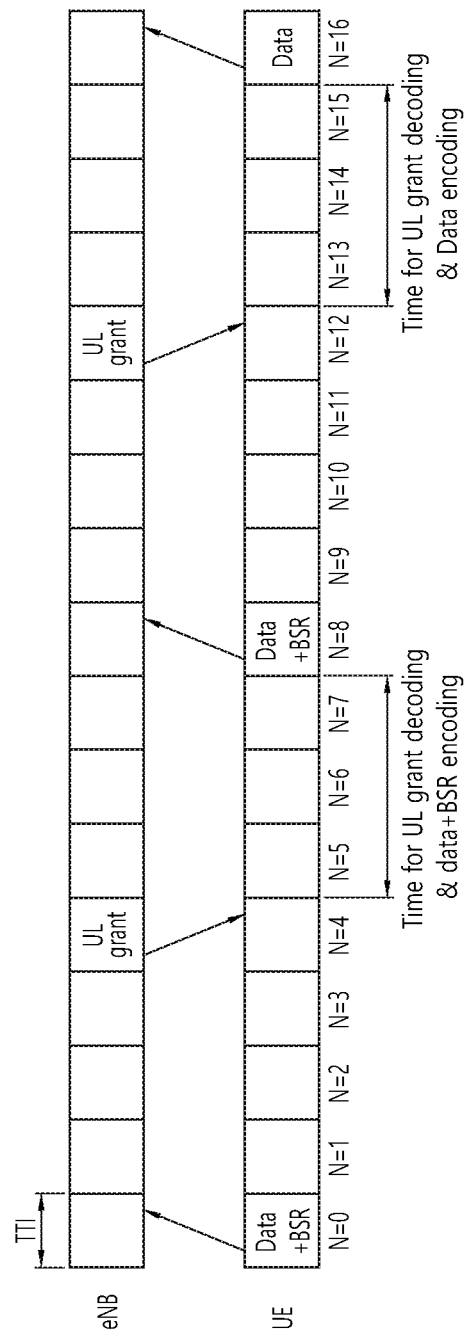
FIG. 7 shows a required time in a method of assigning an uplink resource through a scheduling request (SR) and a buffer status report (BSR) in 3GPP LTE.

FIG. 7 shows a required time in a method of assigning a UL resource through a scheduling request (SR) and a buffer status report (BSR) in 3GPP LTE.

Referring to FIG. 7, a UE transmits data and a BSR to an eNB, and the BS transmits a UL grant to the UE. The UE decodes the UL grant during a specific duration, and encodes the data and the BSR. Thereafter, the UE transmits the encoded data and BSR to the eNB, the eNB transmits the UL grant to the UE, and the UE transmits data to the eNB according to the UL grant. The method of assigning the UL resource through the SR and the BSR of the UE may generate a delay of 17.5 ms in total.

That is, it may take 9.5 ms to 17.5 ms in total as a time of occupying a radio resource and transmitting data by a UE which has transitioned to a connected state. Since it takes 85 ms in total as a time required for the UE in the idle state to transition to the connected state, it may take 94 ms to 102.5 ms in total as a time required for the UE in the idle state to transmit data. Accordingly, a connectionless transmission method may be considered to decrease a delay time depending on the transitioning of the connected state of the UE.

In general, when there is no data to be transmitted, the UE transitions to a discontinuous reception mode or an idle state to achieve power saving or to decrease a network overhead. In the discontinuous reception mode in which a connection set up with the eNB is maintained, a handover is performed when the UE moves between the eNBs. However, in a situation where too many UEs are connected to a single eNB and all UEs are moving UEs, there is a disadvantage in that a signaling overhead is increased in a radio duration for performing the handover. Further, there is a disadvantage in that the UE has to perform the handover frequently when a communication eNB having a small coverage such as a road side unit is installed. Therefore, the connectionless transmission method may be used to decrease the signaling overhead in the radio duration caused by the handover.

In general, a UE having no data being scheduled to be transmitted is shifted to a discontinuous reception mode or idle state (or mode) for power saving or for reducing network overhead. In the discontinuous reception mode, during which the base station maintains the connection configuration (or connection settings), when the UE relocates from one base station to another, the UE performs handover. However, in a situation where a large number of UEs is connected to a single base station and where all of the UEs correspond to mobile terminals (or mobile devices), it is disadvantageous in that the signaling overhead of a wireless section for performing the handover increases. Additionally, in a case where a communication base station having a small coverage, such as a Road Side Unit, is installed, there also lies a disadvantage in that the UE is required to frequently perform the handover. Therefore, in order to reduce the signaling overhead during the wireless section that is caused by the handover, a connectionless transmission method may be used.

Figure 8:
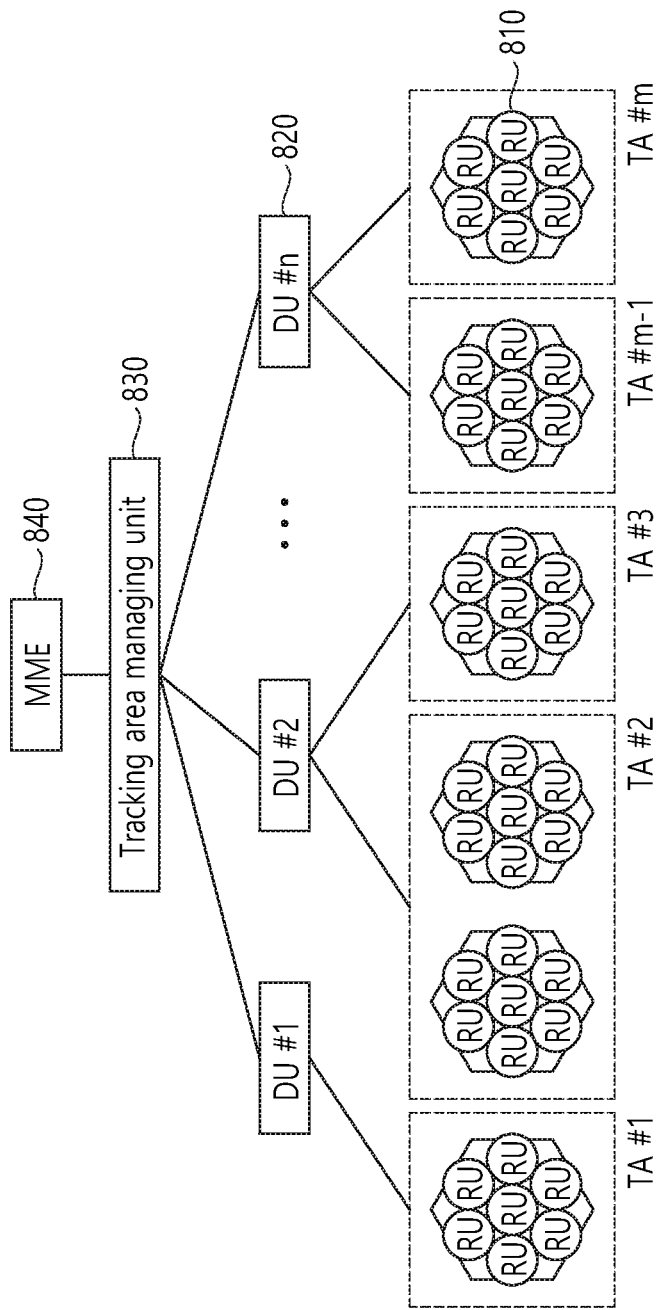
FIG. 8 shows a network environment showing a tracking area.

FIG. 8 shows a network environment showing a tracking area (TA).

Referring to FIG. 8, the base station may be implemented by being divided into an apparatus for processing radio signals (or Remote Radio Head (RRH) or Radio Unit (RU)) and an apparatus for processing digital signals (or Digital Unit (DU)).

A network environment includes a plurality of radio units (RUs) (810), a plurality of digital units (DUs) (DU #1-DU #n) (820), a tracking area managing unit (830), and an MME (840). The tracking area managing unit (830) may be connected to a Femto gateway (not shown). The tracking area managing unit (830) may also be separately implemented, as shown in FIG. 8, or may be implemented in the DU (820).

The RU (810) converts a digital signal that is received from the DU (820) to a radio frequency (RF) signal in accordance with the frequency band and amplifies the converted signal. The RU (810) is installed in a service area. A group of Rus for tracking areas (TA #1-TA #m).

The DU (820) encodes or decodes a radio digital signal and is connected to a core network. One DU (820) may manage a plurality of RUs (810). The DU (820) may be connected to at least one tracking area.

The MME (840) manages a tracking area identifier (TAI) list. The MME (840) transmits a tracking area identifier list of the UE to the UE. The MME (840) sends a request to transmit a paging message to base stations corresponding to tracking areas in which the UE is positioned. In case the UE has a data packet that is to be transmitted, the MME (840) sends a request to transmit a paging message to base stations corresponding to tracking area in which the UE is positioned.

The tracking area managing unit (830) is connected to at least one DU. The tracking area managing unit (830) is dynamically mapped to a plurality of RUs being connected to the DUs (DU #1-DU #n) and dynamically generates tracking areas.

The tracking area managing unit (830) receives the tracking area identifier list of the UE from the MME (840). Then, the tracking area managing unit (830) reconfigures the tracking area identifier list of the UE based on movement information of the UE and network configuration information. The movement information of the UE corresponds to information estimating the movement path of the UE, which is calculated based on movement patterns or history of the UE. The network configuration information may include resource information of the RU/DU, geographical information of the RU, and so on.

In a communication system where the RU and the DU are dynamically connected to one another based on the virtualization technology, the MME (840) only configures the list of tracking area identifiers based on RU/DU information, which is configured during the initial installation, and is incapable of knowing the RU/DU that varies dynamically. However, since the tracking area managing unit (830) knows the information related to the RU/DU, the tracking area managing unit (830) may dynamically map the RUs and may reconfigure the list of tracking area identifiers. By doing so, the tracking area managing unit (830) may reduce the amount of paging messages being unnecessarily transmitted by the RU.

Figure 9:
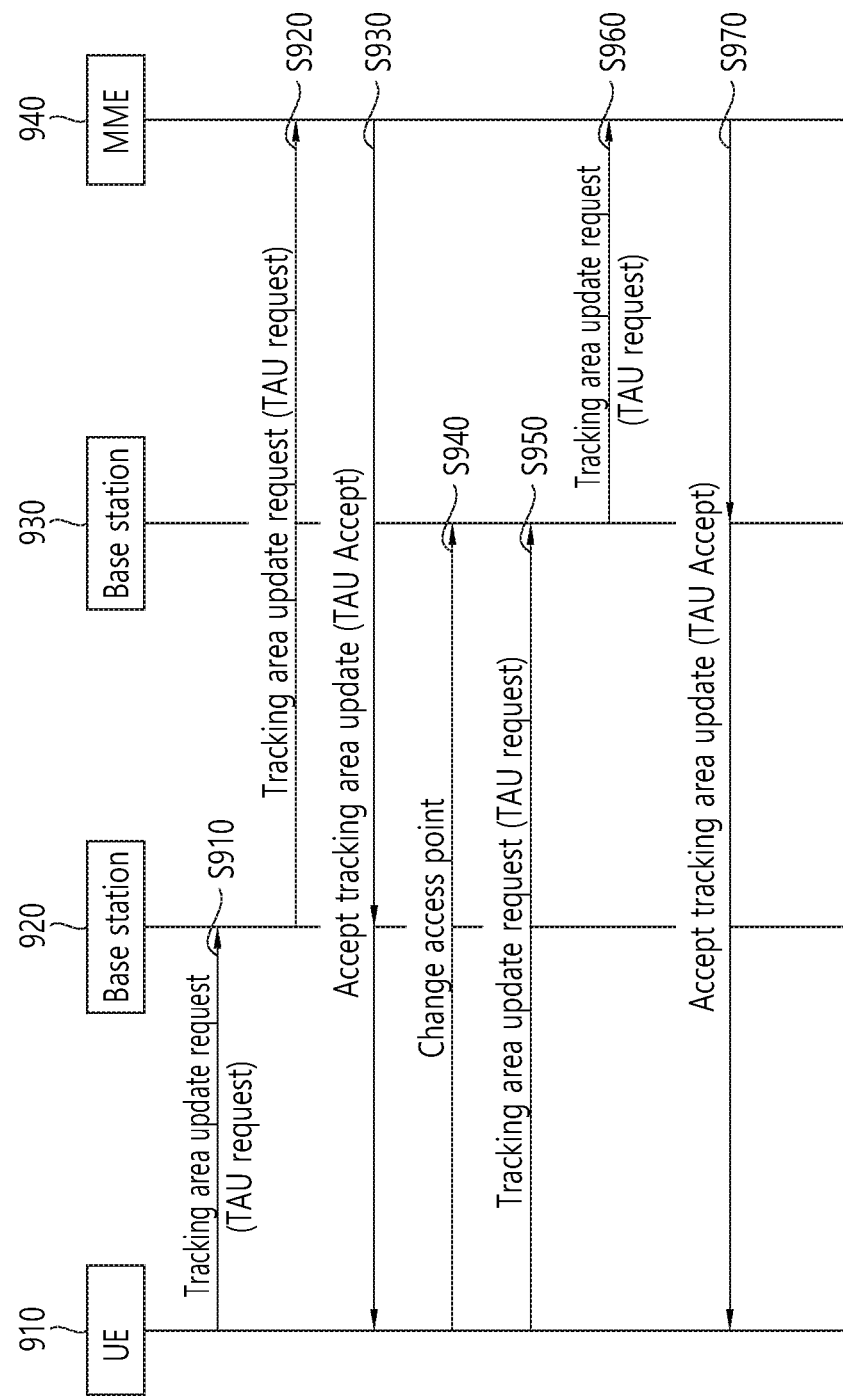
FIG. 9 is a flow chart showing an example of a tracking area update procedure.

FIG. 9 is a flow chart showing an example of a tracking area update procedure.

In case a UE (910) existing in TA #1 moves (or shifts) to TA #2, an MME (940) acquires information on the tracking area of the corresponding UE after its movement (or relocation) by performing a tracking area update (TAU) procedure. Herein, a base station (920) belonging to TA #1 and a base station (930) belonging to TA #2 are differentiated from one another.

Referring to FIG. 9, the UE (910) transmits a tracking area update (TAU) request message to the base station (920) (S910). The tracking area update (TAU) request message includes a tracking area code (TAC), e.g., TAC10, to which the base station (920) belongs.

The base station (920) delivers the tracking area update (TAU) request message to the MME (940) (S920).

The MME (940) transmits a TAU Accept message accepting (or authorizing) the tracking area update to the UE (910) (S930). The MME (940) generates a list of tracking area identifiers (TAIs) based on the TACs including TAC10, which is received from the UE (910), e.g., TAC09, TAC10, TAC11. The MME (940) transmits the TAU Accept message, which includes the tracking area identifier list, to the UE (910). The tracking area identifier list corresponds to tracking areas that are related to the UE (910).

The UE (910) is relocated (or moved) and changes its access point to the base station (930) (S940). The UE (910) does not perform any tracking area update in areas that are included in the tracking area identifier list. However, in case the base station (930) corresponds to a base station being configured with a tracking area code that is not included in the tracking area identifier list, e.g., TAC20, the UE (910) performs the tracking area update as described below.

The UE (910) transmits a tracking area update request message to the base station (930) (S950), and the base station (930) delivers the tracking area update request message to the MME (940) (S960).

The MME (940) transmits a TAU Accept message including the updated tracking area identifier list to the UE (910) (S970). The updated tracking area identifier list may include, for example, TAC19, TAC20, TAC21.

In the next generation communication system, Internet of Things (IoT) services for diverse industries are expected to be adopted. Since the IoT service has diverse requirements each being different from one another, in order to satisfy such requirements, diverse numerologies are needed. Therefore, in the next generation communication system, diverse numerologies are expected to be adopted. Herein, a numerology corresponds to diverse numeric values that may be used in the next generation communication system, which is used for the purpose of high reliability and low latency (or delay). For example, a numerology may correspond to a length of a subframe (TTI length), subcarrier spacing, a number of symbols in a subframe, and/or a CP length, and so on.

A method for adopting diverse numerologies may be divided into two different types. Firstly, a method of applying only one numerology in a single carrier. And, secondly, a method of applying diverse numerologies even in a single carrier. The first method is advantageous for its simple implementation. However, since an available bandwidth is determined for each numerology, this method has poor resource utilization. The second method may have a more complicated implementation as compared to the first method. However, since the available bandwidth for each numerology may be adjusted freely, the second method has excellent resource utilization. In the next generation communication system, since diversification of services is expected, and since the service type being required for each cell may vary from one another, the second method (the method of applying multiple numerologies in a single carrier) should be applied. For example, discussion is being made on the application of multiple numerologies in a single carrier in the current 3GGP.

Since a number of UEs belonging to each cell and the types of services being required by the UEs differ from one another for each cell, the bandwidths being allocated to each numerology may also differ from one another. Accordingly, the positions of resources transmitting a synchronization signal (e.g., PSS or SSS) for each cell may also vary.

In case of a UE operating in a connectionless state (or mode), the base station is incapable of determining the position of the corresponding UE. Therefore, there lies a problem in that the base station is incapable of indicating the UE of the signal transmission resource per numerology of each cell. The UE that is unaware (or uninformed) of the transmission position of the synchronization signal may need to estimate the synchronization signal corresponding to all candidate resource group. And, by doing so, this may cause a considerable amount of overhead to the UE.

In the present invention, a connectionless UE includes both a UE in an active state and a UE in a sleep state, which are disconnected. In the present invention, a unit for managing the movement of a connectionless UE is referred to as a tracking area (TA) and may have different characteristics from those of a tracking area in an existing LTE system. For example, the UE may have a different tracking area in each state. Specifically, the UE may separately have a tracking area for connectionless transmission and a tracking area for an idle state. Further, when the UE desires to perform communication with various numerologies, the UE may have different tracking areas for the numerologies.

In addition, the present invention is described on the basis of single-carrier multiple numerology but may also be extended to a multi-carrier single numerology communication system and a multi-carrier multiple numerology communication system without any modification. In multi-carrier single numerology, different carriers correspond to different numerologies.

That is, the present invention proposes a procedure (procedure 1) for efficiently achieving downlink synchronization when disconnected UEs move to different cells in a next-generation communication system to which a plurality of numerologies is applied.

For example, a connectionless UE transmits a particular preamble (message 1), and a TRP transmits information (message 2) on a synchronization signal transmission resource for a neighboring TRP to the UE upon receiving the particular preamble. Here, the particular preamble may be a preamble in a random access procedure and may be defined in advance.

A connectionless UE needs to synchronize in downlink with any TRP in order to receive a paging signal. In a communication system employing multi-numerology, the location of a resource for transmitting a synchronization signal may be different for each TRP. When the UE fails to identify a synchronization signal transmission location in advance, the UE needs to attempt to detect a synchronization signal from all candidates, thus requiring great overheads. Generally, a UE attempts to detect only one synchronization signal at a time. Thus, when the number of resources for transmitting a synchronization signal is X and a synchronization signal transmission interval is 10 ms, a time of up to 10*X ms is needed to achieve synchronization. Further, since synchronization is frequently performed a plurality of times in order to accurately achieve synchronization, the time actually required to achieve synchronization further increases.

In order to solve this problem, the present invention proposes a procedure in which a UE receives information on a synchronization signal transmission resource from a TRP with which the UE currently synchronized in downlink. Further, in the proposed procedure, even though a collision occurs in message 1, message 2 is transmitted without performing contention resolution, because message 2 is multicast to all UEs requesting message 1.

Information in message 2 includes a list of synchronization signal transmission resources for a neighboring TRP. The location of a synchronization signal transmission resource may be different for each TRP. Therefore, location information on synchronization signal transmission resources for neighboring TRPs is listed and transmitted. However, since the UE cannot receive information from a TRP before synchronization, the list of synchronization signal transmission resources is not mapped to a TRP identifier one to one. That is, the TRP merely lists and transmits the location information on the synchronization signal transmission resources without displaying identifiers of the neighboring TRPs.

Figure 10:
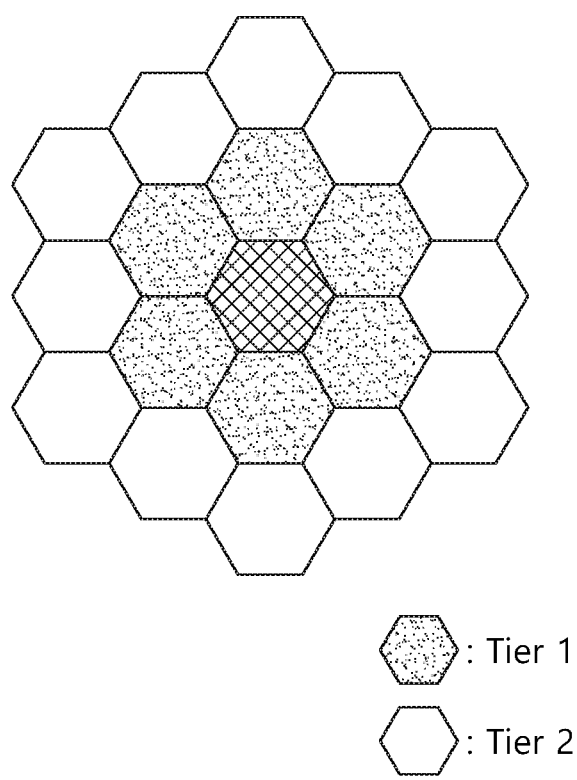
FIG. 10 illustrates an example of a tier-1 TRP and a tier-2 TRP according to an embodiment of the present invention.

FIG. 10 illustrates an example of a tier-1 TRP and a tier-2 TRP according to an embodiment of the present invention.

FIG. 10 shows a case where a synchronization signal transmission resource list is generated in view of the tier-1 TRP and the tier-2 TRP based on a TRP with which a UE is currently synchronized. Here, the tier-1 TRP may correspond to a TRP belonging to tier 1, and the tier-2 TRP may correspond to a TRP belonging to tier 2. Further, in the present embodiment, it is assumed that the UE has high mobility and belongs to a small cell.

When the UE reaches tier 2 and is synchronized with the TRP belonging to tier 2, the UE may update a synchronization signal transmission resource. That is, 1) when the UE is synchronized with the TRP belonging to tier 2 and the identifier of the TRP belonging to tier 2 is determined to correspond to a TRP for which update of a synchronization signal transmission resource needs to be requested, the UE transmits message 1 in order to update a synchronization signal transmission resource. 2) Even when the identifier of the TRP belonging to tier 2 does not belong to the identifiers of TRPs to which the synchronization signal transmission resource list included in message 2 is applied, the UE transmits message 1 to update a synchronization signal transmission resource.

The TRP transmits, to the UE, a TRP identifier to which the synchronization signal transmission resource list is applied and a TRP identifier for which update of the synchronization signal transmission resource list needs to be requested so that the UE can transmit message 1 to update a synchronization signal transmission resource. In both 1) and 2), the identifier of the TRP belonging to tier 2 may be a TRP identifier for which update of the synchronization signal transmission resource list needs to be requested.

Further, when the TRP with which the UE is synchronized is a TRP that is not present in the synchronization signal transmission resource list as in 2), the UE may request update of the synchronization signal transmission resource list. This is because the UE has moved out of the synchronization signal transmission resource list.

Message 2 may include synchronization signal transmission period information along with a synchronization signal transmission resource list for a neighboring TRP. When a synchronization signal transmission period is different for each TRP, it is necessary to report a synchronization signal transmission period for each synchronization signal transmission resource. This is because if a synchronization signal transmission period for a random TRP is T, the UE needs to attempt to detect a synchronization signal for a minimum time of T or more in order to achieve synchronization.

In addition, the TRP may report the synchronization signal transmission resource list for the neighboring TRP included in message 2 by numerology. It is assumed that the UE receives a paging signal or can arbitrarily select numerology for establishing a connection. In this case, the UE needs to have a synchronization signal transmission resource list by numerology.

Also, the TRP reports a different synchronization signal transmission resource list for each preamble type. It is necessary for a UE having a high moving speed to configure a synchronization signal transmission resource considering even the TRP of tier 2 of FIG. 10. It may be sufficient for a UE having a slow moving speed to configure a synchronization signal transmission resource considering the TRP of tier 1 of FIG. 10. Therefore, a preamble to be transmitted by the UE is selected according to the moving speed, and the TRP transmits a different synchronization signal transmission resource list according to the type of the preamble.

In another example, the TRP masks a downlink control signal included in message 2 with a prearranged temporary identifier (e.g., RNTI) so that the UE can receive message 2. Here, the temporary identifier changes depending on the TRP. The synchronization signal transmission resource list for the neighboring TRP may change for each TRP. Therefore, when the UE receives a synchronization signal transmission resource list from TRP 1, the temporary identifier (RNTI) needs to be changed according to the TRP in order to prevent the UE from receiving a signal transmitted by TRP 2.

To specify the above example, a scheme for mapping different temporary identifier (RNTI) values according to TRP identifiers is proposed. For example, RNTI=f(mod(TRP_ID, K)), where TRP_ID is a TRP identifier, K is an integer, and f( ) is a function for mapping an input value to an RNTI. A temporary identifier mapping rule according to a TRP identifier is a value shared in advance between the UE and the TRP or determined by a system.

Neighboring TRPs have different TRP identifiers so that the UE can distinguish the TRPs. Therefore, using a TRP identifier, a temporary identifier used for transmitting message 2 may be set differently.

Also, even in the same TRP, a mapped RNTI value may change according to a preamble. For example, when preamble 1 and preamble 2 are allocated to a single TRP in order to update a synchronization signal transmission resource, RNTI_1=f_1(mod(TRP_ID, K)) and RNTI_2=f_2(mod(TRP_ID, K)) may be allocated as respective temporary identifiers. That is, a received synchronization signal transmission resource list may change depending on the preamble type. In this case, different RNTI values needs to be mapped according to the preamble type so that the UE can accurately receive a desired signal.

In another example, a preamble to be used in message 1 is managed by tracking area. When a UE moves from tracking area 1 to tracking area 2, the UE receives preamble information to be used in tracking area 2 through a paging signal. The UE in the connectionless state manages mobility by tracking area. Therefore, it is appropriate to manage the preamble for message 1 by tracking area.

In addition, the preamble to be used in message 1 may vary according to not only the tracking area but also the TRP identifier. When resources for transmitting a preamble are the same for neighboring TRPs, a TRP identifier is needed to distinguish a TRP to which the UE has transmitted an update request.

Further, the preamble to be used in message 1 may vary according to not only the tracking area but also the moving speed of a UE. It is necessary for a UE having a high moving speed to configure a synchronization signal transmission resource considering even the TRP of tier 2 of FIG. 10. It may be sufficient for a UE having a slow moving speed to configure a synchronization signal transmission resource considering the TRP of tier 1 of FIG. 10. Therefore, a preamble to be transmitted by the UE is selected according to the moving speed, and the TRP transmits a different synchronization signal transmission resource list according to the type of the preamble.

Figure 11:
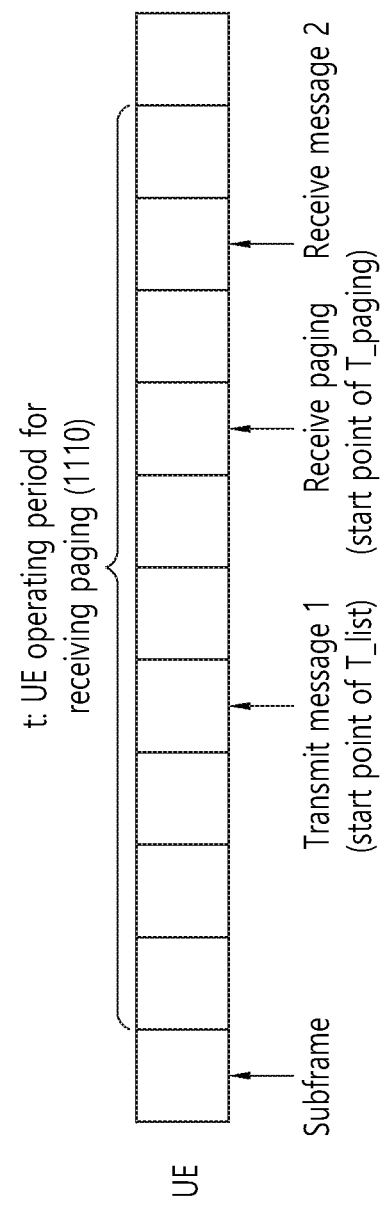
FIG. 11 illustrates an example of updating a synchronization signal resource information list in a period for receiving a paging signal according to an embodiment of the present invention.

FIG. 11 illustrates an example of updating a synchronization signal resource information list in a period for receiving a paging signal according to an embodiment of the present invention.

A TRP (BS) sets T_list, which is a period for transmitting message 1 to a UE. T_list may be set separately from T_paging, which is a period for receiving a paging signal.

Here, T_list=N*T_paging or T_paging=N*T_list, where N is an integer greater than 1. In addition, when the length of a period 1110 in which the UE wakes up to receive a paging signal is t, the start points of T_list and T_paging are set such that the UE transmits message 1 within the period of t.

In order to reduce the power consumption of the UE, it is effective that the UE receives a paging signal and] transmits message 1 at the same time once waking up from the idle state. Therefore, it is preferable that T_list and T_paging set to be in an integer-multiple relationship and the reception of a paging signal and the transmission of message 1 are performed at the same time every particular period. FIG. 11 illustrates an example in which the UE updates a synchronization signal transmission resource list within the period 1110 of t by adjusting the start points of T_list and T_paging.

In another example, the UE may arbitrarily transmit message 1 without any instruction from the BS. The UE in the connectionless state may determine the time to perform a random access procedure if needed (e.g., uplink data is generated). Similarly, the UE also needs to be able to request the update of a synchronization signal transmission resource list when it is expected that the UE will move to a TRP for which the UE does not have the synchronization signal transmission resource list in view of the moving speed of the UE and cell coverage.

Further, the UE may transmit message 1 when waking up to receive a paging signal. However, when the UE is expected to depart from a TRP included in a synchronization signal transmission resource list before a next paging signal is transmitted (before a next paging signal period), the UE wakes up and transmits message 1. In order to efficiently use the power of the UE, it is preferable that the UE transmit s message 1 when waking up to receive a paging signal.

In another example, when the UE switches to the connectionless state, the UE receives tracking area information, preamble information by tracking area, and a synchronization signal transmission resource list for a neighboring TRP. Further, as described above, the UE may also receive synchronization signal transmission period information and information on a synchronization signal transmission resource list by numerology.

The present invention also proposes another procedure (procedure 2) for efficiently achieving downlink synchronization when disconnected UEs move to different cells in a next-generation communication system to which a plurality of numerologies is applied.

A procedure in which a UE updates a synchronization signal transmission resource list for a neighboring TRP may include four steps including message 1 to message 4 of a random access procedure. First, message 1 is a preamble for connectionless transmission that the UE transmits to a BS, and message 2 is a response signal to the preamble that the BS transmits to the UE. Message 3 is a signal for the UE to transmit uplink data to the BS using scheduling information of message 2, and message 4 is a response signal that the BS transmits to the UE in response to the uplink data and is transmitted including a synchronization signal transmission resource list for a neighboring TRP. Through the response signal of message 4, the UE may determine whether a signal is successfully transmitted via message 3 and whether a collision with another UE is resolved.

In procedure 2, the scheme of procedure 1 is performed during a connectionless transmission procedure. The UE in the connectionless state transmits message 1 for data transmission, and connectionless transmission is completed upon receiving message 4. The UE that needs a synchronization signal transmission resource list for a neighboring TRP may request the list via message 3. Therefore, the BS transmits message 4 including the synchronization signal transmission resource list for the neighboring TRP.

That is, message 4 of procedure 2 may include the synchronization signal transmission resource list for the neighboring TRP. Further, a prearranged temporary identifier (e.g., RNTI) may be set in order to receive message 2 and message 4. The BS masks a signal of message 2 and/or message 4 using the temporary identifier.

In addition, when the UE in the connectionless state transmits message 3, the UE transmits an identifier for requesting the update of the synchronization signal transmission resource list for the neighboring TRP. Unlike in procedure 1, in procedure 2, since the BS does not manage the mobility of the UE in the connectionless state, the UE is required to autonomously request the update of the synchronization signal transmission resource list for the neighboring TRP.

The preamble included in message 1 for the UE in the connectionless state may be partly or entirely the same as the preamble included in message 1 in procedure 1. The UE using a preamble that is used for both message 1 in procedure 1 and message 1 for the connectionless state may receive the synchronization signal transmission resource list for the neighboring TRP when receiving message 2. In this case, when transmitting message 3, the UE does not request the update of the synchronization signal transmission resource list.

Further, the present invention proposes still another procedure (procedure 3) for efficiently achieving downlink synchronization when disconnected UEs move to different cells in a next-generation communication system to which a plurality of numerologies is applied. Procedure 3 is based on the fact that a UE which is powered off needs to be authenticated when powered on and initially connected to a BS.

A procedure in which a UE updates a synchronization signal transmission resource list for a neighboring TRP may include four steps including message 1 to message 4 of a random access procedure. First, message 1 is a preamble for connectionless transmission that the UE transmits to a BS, and message 2 is a response signal to the preamble that the BS transmits to the UE. Message 3 is a signal for the UE to transmit authentication information to the BS using scheduling information of message 2, and message 4 is a response signal that the BS transmits to the UE in response to the authentication information and is transmitted including a synchronization signal transmission resource list for a neighboring TRP. Through the response signal of message 4, the UE may determine whether a collision with another UE is resolved and whether authentication is completed.

Procedure 3 is based on procedure 1 but may be used to transmit a synchronization signal transmission resource list for a TRP only to an authenticated UE. To this end, a procedure in which the UE transmits authentication information through message 3 is added, and the BS transmits the synchronization signal transmission resource list for the neighboring TRP along with information indicating authentication completion through message 4.

Message 4 of procedure 3 may include the synchronization signal transmission resource list for the neighboring TRP. Further, a prearranged temporary identifier (e.g., RNTI) may be set in order to receive message 2 and message 4. The BS masks the signals of message 2 and/or message 4 using the temporary identifier.

In addition, the present invention proposes another procedure (procedure 4) for efficiently achieving downlink synchronization when disconnected UEs move to different cells in a next-generation communication system to which a plurality of numerologies is applied. Procedure 4 is a scheme that enables a UE to identify a synchronization signal transmission location for a neighboring TRP even though not transmitting a preamble.

All TRPs may transmit a synchronization signal transmission location for a neighboring TRP via a signal, such as a system information block (SIB), broadcast within coverage. Here, when the UE wakes up to receive a paging signal, the UE may decode the SIB, thereby recognizing a synchronization signal transmission location for a neighboring TRP.

For example, neighboring signal synchronization information may be transmitted via an nth SIB. In this case, the UE needs to decode up to the nth SIB in order to recognize the synchronization signal transmission location. Therefore, it is necessary to notify the UE in advance of the index of an SIB including a synchronization signal transmission location in advance or to prearrange the SIB.

For example, since a large amount of information cannot be transmitted through an SIB, only synchronization signal transmission information on tier-1 TRPs may be transmitted through an SIB. Here, when the UE desires to recognize synchronization signal transmission information on a greater number of TRPs like tier 2, procedure 1 may be employed.

Figure 12:
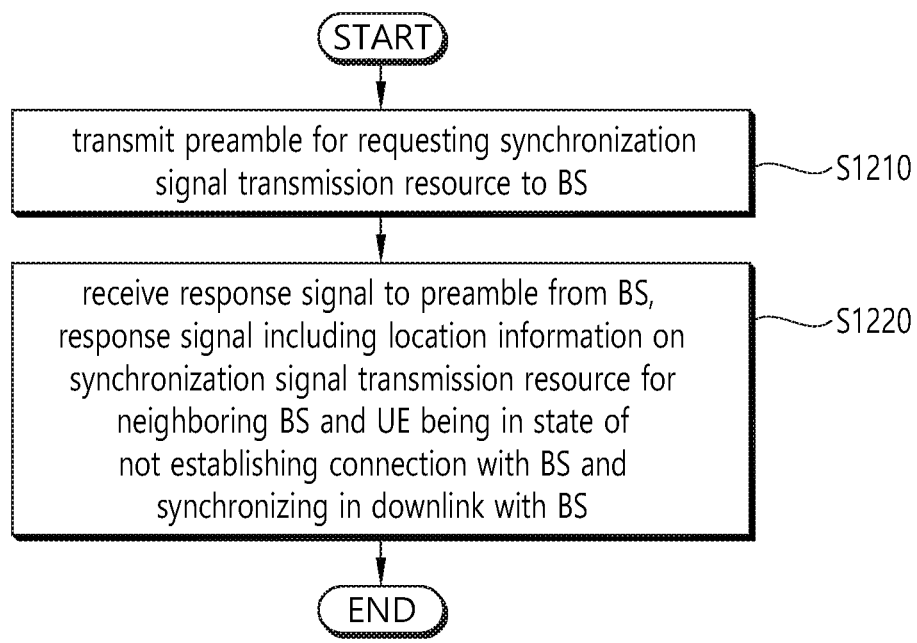
FIG. 12 is a flowchart illustrating a procedure for measuring downlink synchronization in a wireless communication system to which a plurality of numerologies is applied according to an embodiment of the present invention.

FIG. 12 is a flowchart illustrating a procedure for measuring downlink synchronization in a wireless communication system to which a plurality of numerologies is applied according to an embodiment of the present invention.

Defining terms first, a connectionless transmission procedure may correspond to a procedure in which a UE transmits data to a BS in a state where a connection between the UE and the BS is not established. The state where the connection between the UE and the BS is not established may correspond to an RRC-unconnected state, an idle state, or an inactive state. A connection transmission procedure may correspond to a procedure in which a UE transmits data to a BS after establishing an RRC connection and a data connection with the BS. Numerology may correspond to various values that can be used in next-generation wireless communication systems to achieve high reliability and low delay. For example, numerology may be a subframe length (TTI length), subcarrier spacing, the number of symbols of a subframe, and/or a CP length.

First, in step S1210, a UE transmits a preamble for requesting a synchronization signal transmission resource to a BS. Here, the UE is in a state of not establishing a connection with the BS (disconnected state) and of synchronizing in downlink with the BS.

In step S1220, the UE receives a response signal to the preamble from the BS. The response signal includes location information on a synchronization signal transmission resource for a neighboring BS. That is, even though the UE is in the disconnected state, the UE receives the location information on the synchronization signal transmission resource for the neighboring BS from the BS with which the UE currently synchronizes in downlink, thus efficiently achieving downlink synchronization even though the UE moves to another cell.

In addition, there is a case where the location information on the synchronization signal transmission resource needs to be updated. When the UE moves within the coverage of the neighboring BS to which the location information on the synchronization signal transmission resource is applied, the UE may receive an identifier of the neighboring BS from the neighboring BS. The UE may transmit a preamble for requesting the update of the location information on the synchronization signal transmission resource to the neighboring BS. That is, when the UE identifies, through the identifier of the neighboring BS, that the neighboring BS is a BS for which the location information on the synchronization signal transmission resource needs to be updated, the UE may transmit the preamble (message 1) requesting the update.

When the UE is out of the coverage of the neighboring BS to which the location information on the synchronization signal transmission resource is applied, the UE may transmit a preamble for requesting the update of the location information on the synchronization signal transmission resource to a BS out of the coverage of the neighboring BS.

The response signal may further include transmission period information on a synchronization signal. The UE may detect the synchronization signal for a time indicated by the transmission period information on the synchronization signal.

The preamble may be selected according to the moving speed of the UE. When the moving speed of the UE is high, a synchronization signal transmission resource may be configured in view of wide coverage. When the moving speed of the UE is low, a synchronization signal transmission resource may be configured in view of narrow coverage.

The location information on the synchronization signal transmission resource may be determined according to the preamble. That is, the BS may notify the UE of a different synchronization signal transmission resource list depending on the type of a preamble.

Downlink control information of the response signal may be masked with a temporary identifier to be transmitted. The temporary identifier may change depending on an identifier of the BS or the preamble. Downlink control information may be masked with a different temporary identifier value depending on the identifier of the BS or the preamble, thus enabling the UE to accurately receive a desired signal.

When the UE moves from a first tracking area to a second tracking area, the UE may receive preamble information to be used in the second tracking area through a paging signal. The preamble may be determined based on the preamble information. That is, the UE may manage a preamble by tracking area.

The preamble may be transmitted during a time interval in which the paging signal can be received. The BS may set a period for transmitting a preamble and a period for transmitting a paging signal. Here, the UE may jointly process an operation of transmitting a preamble and an operation of receiving a paging signal every specified period in view of the start points of the two periods, which is efficient in reducing the power consumption of the UE.

Figure 13:
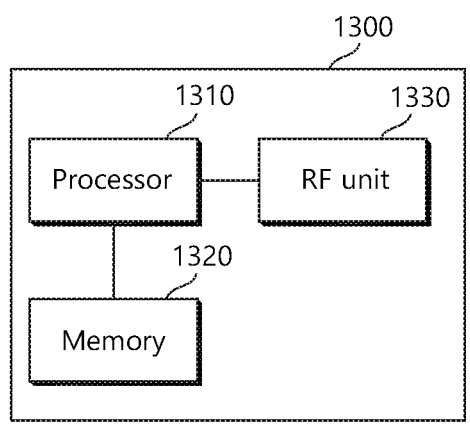
FIG. 13 is a block diagram showing an apparatus for wireless communication for implementing an embodiment of the present invention.

FIG. 13 is a block diagram showing an apparatus for wireless communication for implementing an embodiment of the present invention.

An apparatus 1300 for wireless communication includes a processor 1310, a memory 1320 and a radio frequency (RF) unit 1330.

The processor 1310 may be configured to implement proposed functions, procedures and/or methods described in this description. Layers of the radio interface protocol may be implemented in the processor 1310. The processor 1310 may handle a procedure explained above. The memory 1320 is operatively coupled with the processor 1310, and the RF unit 1330 is operatively coupled with the processor 1310.

The processor 1310 may include application-specific integrated circuit (ASIC), other chipset, logic circuit and/or data processing device. The memory 1320 may include read-only memory (ROM), random access memory (RAM), flash memory, memory card, storage medium and/or other storage device. The RF unit 1330 may include baseband circuitry to process radio frequency signals. When the embodiments are implemented in software, the techniques described herein can be implemented with modules (e.g., procedures, functions, and so on) that perform the functions described herein. The modules can be stored in memory 1320 and executed by processor 1310. The memory 1320 can be implemented within the processor 1310 or external to the processor 1310 in which case those can be communicatively coupled to the processor 1310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for achieving downlink synchronization by a user equipment (UE) in a wireless communication system, the method comprising:
   transmitting a preamble for requesting a synchronization signal transmission resource to a base station (BS); and
   receiving a response signal to the preamble from the BS,
   wherein the response signal comprises location information on a synchronization signal transmission resource for a neighboring BS,
   wherein the UE is in a state of not establishing a connection with the BS and synchronizing in downlink with the BS, and
   wherein the response signal further comprises transmission period information on a synchronization signal, and the method further comprises detecting the synchronization signal for a time indicated by the transmission period information on the synchronization signal.

2. The method of claim 1, further comprising:
   receiving an identifier of the neighboring BS from the neighboring BS; and
   transmitting a preamble for requesting update of the location information on the synchronization signal transmission resource to the neighboring BS,
   when the UE moves within coverage of the neighboring BS to which the location information on the synchronization signal transmission resource is applied.

3. The method of claim 1, further comprising:
   transmitting a preamble for requesting update of the location information on the synchronization signal transmission resource to a BS out of coverage of the neighboring BS when the UE is out of the coverage of the neighboring BS to which the location information on the synchronization signal transmission resource is applied.

4. The method of claim 1, wherein the preamble is selected according to a moving speed of the UE, and the location information on the synchronization signal transmission resource is determined according to the preamble.

5. The method of claim 1, wherein downlink control information of the response signal is masked with a temporary identifier to be transmitted, and the temporary identifier changes depending on an identifier of the BS or the preamble.

6. The method of claim 1, further comprising:
   receiving preamble information to be used in a second tracking area through a paging signal when the UE moves from a first tracking area to the second tracking area,
   wherein the preamble is determined based on the preamble information.

7. The method of claim 6, wherein the preamble is transmitted during a time interval in which the paging signal is received.

8. A user equipment (UE) for achieving downlink synchronization in a wireless communication system, the UE comprising:
   a radio frequency (RF) unit to transmit and receive a radio signal; and
   a processor connected to the RF unit,
   wherein the processor is configured to:
   transmit a preamble for requesting a synchronization signal transmission resource to a base station (BS); and
   receive a response signal to the preamble from the BS,
   wherein the response signal comprises location information on a synchronization signal transmission resource for a neighboring BS,
   wherein the UE is in a state of not establishing a connection with the BS and synchronizing in downlink with the BS, and
   wherein the response signal further comprises transmission period information on a synchronization signal, and the method further comprises detecting the synchronization signal for a time indicated by the transmission period information on the synchronization signal.

9. The UE of claim 8, wherein, when the UE moves within coverage of the neighboring BS to which the location information on the synchronization signal transmission resource is applied, the processor receives an identifier of the neighboring BS from the neighboring BS and transmits a preamble for requesting update of the location information on the synchronization signal transmission resource to the neighboring BS.

10. The UE of claim 8, wherein, when the UE is out of the coverage of the neighboring BS to which the location information on the synchronization signal transmission resource is applied, the processor transmits a preamble for requesting update of the location information on the synchronization signal transmission resource to a BS out of coverage of the neighboring BS.

11. The UE of claim 8, wherein the preamble is selected according to a moving speed of the UE, and the location information on the synchronization signal transmission resource is determined according to the preamble.

12. The UE of claim 8, wherein downlink control information of the response signal is masked with a temporary identifier to be transmitted, and the temporary identifier changes depending on an identifier of the BS or the preamble.

13. The UE of claim 8, wherein, when the UE moves from a first tracking area to the second tracking area, the processor receives preamble information to be used in a second tracking area through a paging signal, and
   the preamble is determined based on the preamble information.

* * * * *